(12) United States Patent
Hsieh et al.

(10) Patent No.: US 10,986,015 B2
(45) Date of Patent: Apr. 20, 2021

(54) MICRO SERVER BUILT-IN SWITCH UPLINK PORT BACKUP MECHANISM

(71) Applicant: QUANTA COMPUTER INC., Taoyuan (TW)

(72) Inventors: Meng-Huan Hsieh, Taoyuan (TW); Yu-Jung Chang, Taoyuan (TW); Te-Kuai Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/138,128

(22) Filed: Sep. 21, 2018

(65) Prior Publication Data

US 2019/0363973 A1 Nov. 28, 2019

Related U.S. Application Data

(60) Provisional application No. 62/676,016, filed on May 24, 2018.

(51) Int. Cl.
*G06F 3/06* (2006.01)
*H04L 12/707* (2013.01)
(Continued)

(52) U.S. Cl.
CPC .......... *H04L 45/22* (2013.01); *H04L 41/0668* (2013.01); *H04L 45/02* (2013.01);
(Continued)

(58) Field of Classification Search
CPC .............. H04L 45/28; H04L 41/0654; H04L 2012/5627; H04L 41/0659; H04L 41/0668;
(Continued)

(56) References Cited

U.S. PATENT DOCUMENTS 6,148,411 A * 11/2000 Ichinohe ............. H04L 41/0213
714/21
7,152,179 B1 * 12/2006 Critchfield .............. H04L 12/56
714/4.11
(Continued)

FOREIGN PATENT DOCUMENTS

JP 2018007093 A 1/2018
TW I395433 B1 5/2013
(Continued)

OTHER PUBLICATIONS

TW Office Action for Application No. 107141311, dated Jul. 16, 2019, w/ First Office Action Summary.
(Continued)

*Primary Examiner* — Edan Orgad
*Assistant Examiner* — Malick A Sohrab
(74) *Attorney, Agent, or Firm* — Nixon Peabody LLP

(57) ABSTRACT

A system and method for ensuring reliable network communication for a multi-node server is disclosed. The multi-node server includes a first node having a port operable to transmit data packets. A first internal switch has a downstream port coupled to the port of the first node, an interconnection port, and uplink ports coupled to the network. The uplink ports routes data packets from the first node to the network. A second internal switch has a downstream port, an interconnection port coupled to the interconnection port of the first internal switch, and an uplink port coupled to the network. On failure of network communication at the uplink ports of the first internal switch, data packets from the first node are routed through the interconnection ports and through the uplink port of the second internal switch to the network.

20 Claims, 6 Drawing Sheets

(51) Int. Cl.
*H04L 12/24* (2006.01)
*H04L 12/751* (2013.01)
*H04L 12/703* (2013.01)
*H04L 12/741* (2013.01)
*H04L 29/14* (2006.01)
*H04L 29/08* (2006.01)

(52) U.S. Cl.
CPC ............ *H04L 45/28* (2013.01); *H04L 45/745* (2013.01); *H04L 69/40* (2013.01); *H04L 67/10* (2013.01)

(58) Field of Classification Search
CPC ......... H04L 1/22; H04L 45/22; H04L 45/745; H04L 69/40; H04L 45/02; H04L 67/10
See application file for complete search history.

(56) References Cited

U.S. PATENT DOCUMENTS

| | | | |
|---|---|---|---|
| 8,730,963 B1 | 5/2014 | Grosser, Jr. et al. | |
| 8,780,699 B1* | 7/2014 | Hasan | H04L 1/22 370/219 |
| 2007/0294433 A1* | 12/2007 | Leigh | H04L 49/00 709/250 |
| 2011/0090804 A1 | 4/2011 | Wusirika | |
| 2015/0100725 A1* | 4/2015 | Ganapathy | H04L 41/12 711/114 |
| 2015/0312135 A1* | 10/2015 | Moopath Velayudhan | H04L 45/16 370/390 |
| 2015/0319083 A1 | 11/2015 | Grosser, Jr. et al. | |

FOREIGN PATENT DOCUMENTS

| | | |
|---|---|---|
| TW | M547698 U | 8/2017 |
| TW | M556974 U | 3/2018 |

OTHER PUBLICATIONS

TW Search Report for Application No. 107141311, dated Jul. 16, 2019, w/ First Office Action.
Extended European Search Report for EP Application No. 19155991.3, dated Jul. 18, 2019.
JP Office Action for Application No. 2019-036174, dated Apr. 7, 2020, w/ First Office Action Summary.
Mitsuki Abe; Network, 131, Introduction! Network Equipment, Mar. 2011, 6 pages, Nikkei Business Publications, Inc., Japan.

* cited by examiner

10,986,015 B2

MICRO SERVER BUILT-IN SWITCH UPLINK PORT BACKUP MECHANISM

PRIORITY CLAIM

The present application claims priority under U.S. Provisional Application No. 62/676,016 filed on May 24, 2018. The contents of that application are hereby incorporated by reference in their entirety.

TECHNICAL FIELD

The present disclosure relates generally to ensuring network reliability for nodes in a server, and more specifically to using interconnection ports between switches to provide a backup when an uplink between switches and a network is interrupted.

BACKGROUND

The emergence of the cloud for computing applications has increased the demand for off-site installations, known as data centers, that store data and run applications accessed by remotely connected computer device users. A typical data center has physical chassis structures with attendant power and communication connections. Each rack may hold multiple network devices such as servers for computing, storage, or controls as well as appropriate network and management switches.

A computing server will typically include several processors or nodes. Each processor must communicate with the other processors on the server to effectively complete computing tasks. Thus, computing tasks are often divided between the cores on a server, and data may be exchanged between the cores and a larger network via uplink ports in internal switches. These internal switches allow other devices in a network to communicate with the nodes in the server. Communication between the network and nodes in the server occurs based on different uplink ports being connected to each of the nodes on the server via the internal switches. One problem with this configuration is that when the uplink communication between the nodes and the network fails, communication cannot be achieved, and thus server operations are impeded.

Each server node within the micro-server communicates to devices outside the micro server via a fixed uplink port of each of the built-in switches. Currently, the uplink ports accessed by the nodes of a server are managed by the built-in internal switches. As a result, when the uplink port is out of order, the associated server node cannot communicate with the network.

To increase the robustness of network communication of micro server nodes, current methods rely on activating the internal switches to provide an alternate path when either an uplink port fails, or an internal or external network connection fails. FIG. 1 is a block diagram of a prior art network system 10 including a micro-server 12. The server 12 includes multiple server nodes such as the nodes 20 and 22. The server 12 also includes multiple internal built-in switches such as built-in switches 30 and 32. Each of the built-in switches include respective up link ports 42, 44, 46, and 48 that allow communication to a network 50. Each of the built-in switches 30 and 32 include respective downstream ports 52, 54, 56, and 58 that are connected to ports on the nodes 20 and 22.

In this example, the node 20 includes a port 62 that is linked to the downstream port 52 of the switch 30, and a port 64 that is linked to the downstream port 56 of the switch 32. The node 22 includes a port 66 that is linked to the downstream port 54 of the switch 30, and a port 68 that is linked to the downstream port 58 of the switch 32. The node 20 may communicate with the network 50 through the switch 30 and corresponding uplink port 52. Similarly, the node 22 may communicate with the network 50 through the switch 32 and the corresponding uplink port 58.

In the case of failure of either the uplink ports 42 and 44, or uplink ports 46 and 48, the associated server nodes 20 or 22 detect the loss of incoming and outgoing packets from the network 50. The associated server nodes 20 and 22 then invoke an uplink port backup mechanism by transmitting and receiving packets from alternative uplink ports of another built-in switch. For example, if the uplink ports 42 and 44 fail, the server node 20 will detect the loss of packets and switch the packet communication to port 64. The packets are thus sent through a link to the downstream port 56 to the switch 32, and through the uplink port 56 to the network 50.

However, two issues are raised in the current implementation of a node changing the internal switch when the uplink ports fail. The first issue is significant packet loss due to the long invocation time for the uplink backup. The server node is not directly connected to the corresponding uplink port. As a result, it takes time to detect the failure of the uplink port, thus resulting in a potentially large amount of packet loss before the uplink port backup mechanism is invoked. Further time is required for the node to switch ports to send packets to the other backup switch. Thus, in the example preceding paragraph, since the node 20 is not directly connected to the failed uplink ports 42 and 44, packets are lost between the time that packet loss is detected. Packets are further lost in the time the backup mechanism takes to switch the packet communication to a new downstream port connected to the switch 32 and corresponding new uplink port 56.

The second issue is degradation of computing power utilization of the nodes involved in the uplink port backup mechanism. The current uplink port backup mechanism is a software based routing routine that includes a software task that must frequently detect for packet losses. Such a mechanism must be run on all of the server nodes, resulting in low computing power utilization of the server node because the node must devote computing resources to the software task.

Thus, there is a need for a mechanism to insure network to node communication in the event that one network connection is broken. There is another need for a mechanism to ensure minimal packet loss when a connection between a node and a network uplink is broken. There is another need for a backup mechanism that does not require server computing power utilization.

SUMMARY

One disclosed example is a system for ensuring reliable network communication for a multi-node device. The multi-node device includes a first node having a port operable to transmit or receive data packets. A first internal switch has a downstream port coupled to the port of the first node, an interconnection port, and uplink ports coupled to the network. The uplink ports route data packets from the first node to the network. A second internal switch has a downstream port; an interconnection port coupled to the interconnection port of the first internal switch; and an uplink port coupled to the network. In response to the first internal switch detecting concurrent failure of network communication at the uplinks port of the first internal switch, a routing process is initialized so that data packets from the first node are routed through the downstream port of the first internal switch, the interconnection ports, and through the uplink port of the second internal switch to the network.

Another example is a method of providing backup communication between a multi-node device and a network. The multi-node server includes a first node having a port. The multi-node device has a first internal switch having a downstream port coupled to the port of the first node; an interconnection port; and uplink ports coupled to the network. The server also includes a second internal switch having a downstream port, an interconnection port coupled to the interconnection port of the first internal switch, and an uplink port coupled to the network. Concurrent failure of network communication at the uplink ports of the first switch is detected. In response, a routing process is initialized. First, data packets from the port of the first node are routed from the first internal switch through the interconnection port of the first and second internal switches. Thereafter, received data packets are routed on the uplink port of the second node to the network.

Another example is a multi-node server with reliable backup connection to a network. The multi-node server includes a first node having a port for data transmission or receipt and a second node having a port for data transmission or receipt. The multi-node server also includes a first internal switch having a first downstream port coupled to the port of the first node; an interconnection port; a packet forwarding table; and uplink ports coupled to the network. The first internal switch includes a filtering routine controlling transmission through the interconnection port. A second internal switch has a downstream port coupled to the port of the second node; an interconnection port coupled to the interconnection port of the first internal switch; a packet routing table; and an uplink port coupled to the network. Upon detecting concurrent failure of network communication at the uplink ports of the first internal switch, a routing process is begun. First, the first internal switch deactivates the filtering routine to allow routing of data transmission from the first node through the interconnection port to the second internal switch. Then, the packet forwarding table of the second internal switch is updated. Finally, data transmission from the first node is sent through the uplink port of the second internal switch to the network.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
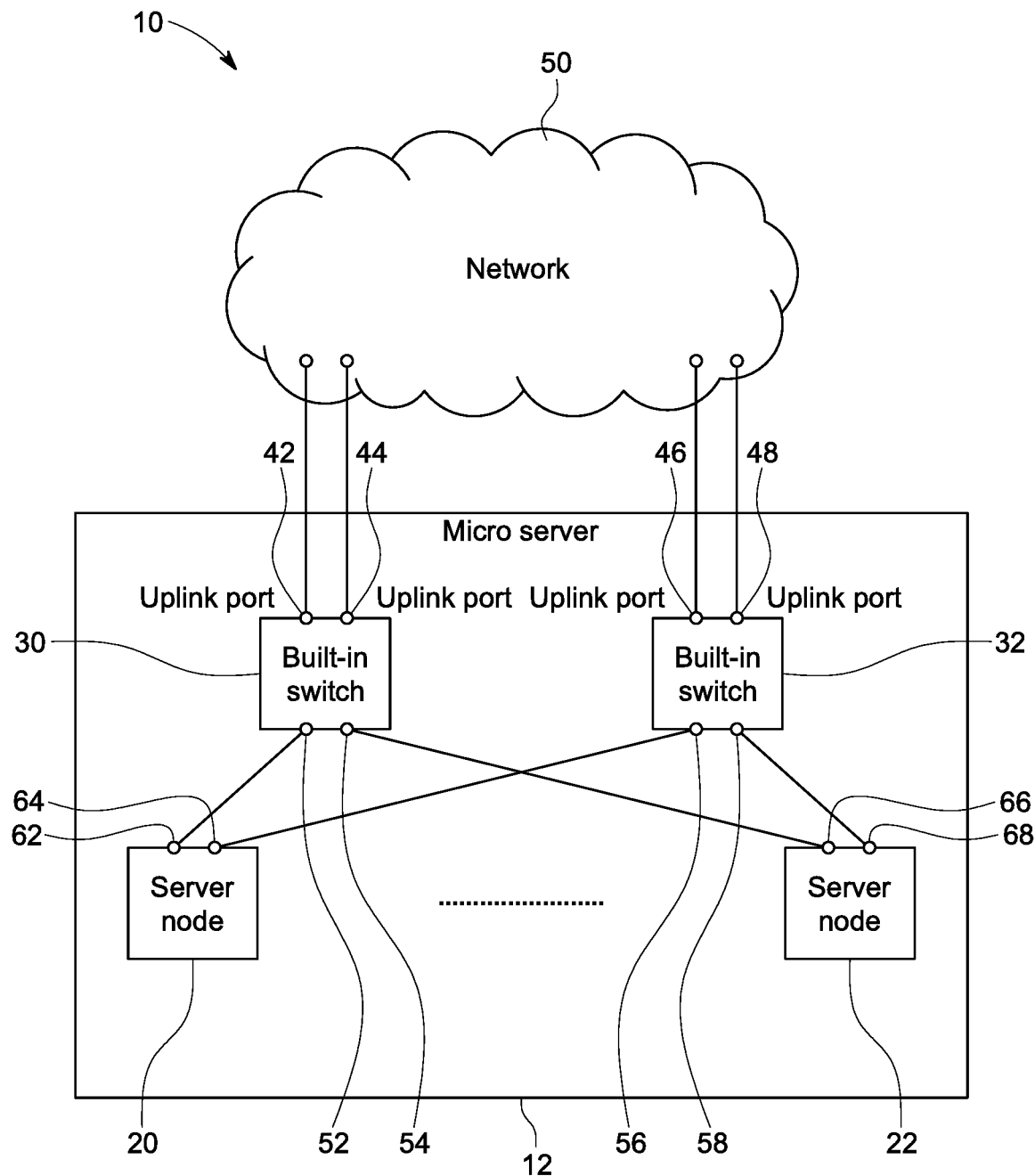
FIG. 1 is a prior art multi-node configuration of a microserver using known backup mechanisms to route packets in the event of an uplink failure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present examples relate to a server uplink port backup mechanism that includes connections between built-in switches, and synchronizing their packet forwarding tables. When an uplink failure takes place, the built-in switch, which detects the failure, forwards the packet from the server node to another built-in switch. On the other hand, since the packet forwarding tables of the built-in switches are synchronized, the packets received on the uplink of the built-in switch for the server node attached to the other built-in switch can be forwarded to the interconnection port and then received by the server node. Thus, the disclosed mechanism provides seamless communication for server nodes to a network because the server nodes are not involved in implementing the backup mechanism. Thus, the disclosed mechanism increases the networking robustness of a multi-node server because delays are eliminated, thereby preventing loss of packets and eliminating the need for server computing power for a backup mechanism.

The disclosed backup mechanism is based on connecting built-in switches with each other via interconnected ports to allow alternate communication with a network. This concept may be seen in FIG. 2, which is a block diagram of an example network system 100. The network system 100 includes multiple devices such as a server 102 with multiple nodes such as the nodes 120 and 122. The server 102 also includes multiple internal built-in switches such as built-in switches 130 and 132. Each of the built-in switches 130 and 132 include respective up link ports 142, 144, 146, and 148 that allow transmission and receipt of data communication to a network 150. Each of the built-in switches 130 and 132 include respective downstream ports 152, 154, 156, and 158 that are connected to ports on the nodes 120 and 122.

In this example, the node 120 includes a port 162 that is linked to the downstream port 152 of the switch 130, and a port 164 that is linked to the downstream port 156 of the switch 132. The node 122 includes a port 166 that is linked to the downstream port 154 of the switch 130, and a port 168 that is linked to the downstream port 158 of the switch 132. The node 120 may communicate with the network 150 through the switch 130 and corresponding uplink port 152, or through the switch 132 and corresponding uplink port 156. Similarly, the node 122 may communicate with the network 150 through the switch 132 and the corresponding uplink port 158, or through the switch 130 and corresponding uplink port 154.

The switch 130 also includes two interconnection ports 172 and 174. The switch 132 also includes two interconnection ports 176 and 178. In this example, the interconnection port 172 of the switch 130 is linked to the interconnection port 176 of the switch 132. The interconnection port 174 of the switch 130 is linked to the interconnection port 178 of the switch 132. Each of the switches 130 and 132 includes synchronized packet forwarding tables. The switches 130 and 132 use the interconnection ports 172, 174, 176, and 178 to periodically report the health status of the uplink ports to the other switch. The interconnection ports 172, 174, 176, and 178 are also used to perform packet forwarding table synchronization in the case of failure of all its uplink ports (i.e., concurrent failure at the uplink ports). Upon receipt of a packet from a connected node, the switches, such as the switch 130, decide which port to forward the packet to, by referencing its packet forwarding table. The packet forwarding table provides the mapping between a network address and which port to forward received packets to the associated network address. In the case that the destination network address of received packet does not exist in the packet forwarding table, the packet is be broadcast to all ports except the one from which the packet is received.

In this example, when all the uplink ports of a switch fails, the switch notifies the other built-in switch of an uplink failure by the interconnected ports 172, 174, 176, and 178. The notification is made in accordance with a backup routine run by the switch. The built-in switch that detects the failure also synchronizes its packet forwarding table with the table of the other built-in switch. Specifically, the switch having failed uplinks notifies the other switch of the network addresses of server nodes that communicate to the network via its uplink ports. Upon receiving these notifications, the other switch programs its packet forwarding table so that packets destined to those network addresses are forwarded to the interconnection ports. For example, the node 120 communicates to the network 150 via the uplink port 142 of the switch 130. If the uplink ports 142 and 144 both fail, the failure will be detected by the switch 130. The switch 130 will notify the switch 132 and synchronize its packet forwarding table with the packet forwarding table of the switch 132. After packet forwarding table synchronization, the switch 132 may forward packets sent to the node 120 to the interconnection ports 176 or 178.

Notifying the other built-in switch of an uplink failure makes the associated server nodes communicate to the network 150 via the interconnected ports and uplink ports of the other switch. In addition, the synchronized packet forwarding table in the new switch reduces unnecessary packet flooding due to uplink failure. Without an address, a received packet would be broadcast to all ports, including uplink ports, downstream ports, and interconnection ports, except the one on which the packet is received if the destination network address does not exist in the packet forwarding table. Packet forwarding table synchronization enables a built-in switch with functioning uplink ports working normally to be aware of network addresses of nodes attached to the other switch. As a consequence, the switch may forward packets, destined to network addresses of nodes attached to the other switch, to its interconnection ports, instead of broadcasting these packets.

By the above described approach, each server node is able to send and receive data via the same port connected to the corresponding built-in switch, even if the uplink failure takes place on an uplink port of the switch. As a consequence, the server nodes do not need to be involved in uplink port failure handling. In addition, the built-in switches 130 and 132 take care of uplink failure, instead of the server nodes 120 and 122 having to take care of uplink failure. Thus, the mechanism is more responsive to uplink failure, thus reducing the packet losses resulting from an uplink failure.

Each built-in switch with an uplink port working correctly periodically issues a keep-alive message, and reports the status of its uplink port to the other built-in switch via one of the interconnected ports. Packet filtering rules are configured on the interconnected ports, which allow only keep-alive messages to be transmitted and received on the ports in normal operation. The failure of uplink ports will be remedied as soon as a keep-alive message is received. Packet losses are kept at a minimum as only packets between the period of keep-alive messages are lost.

Figure 2:
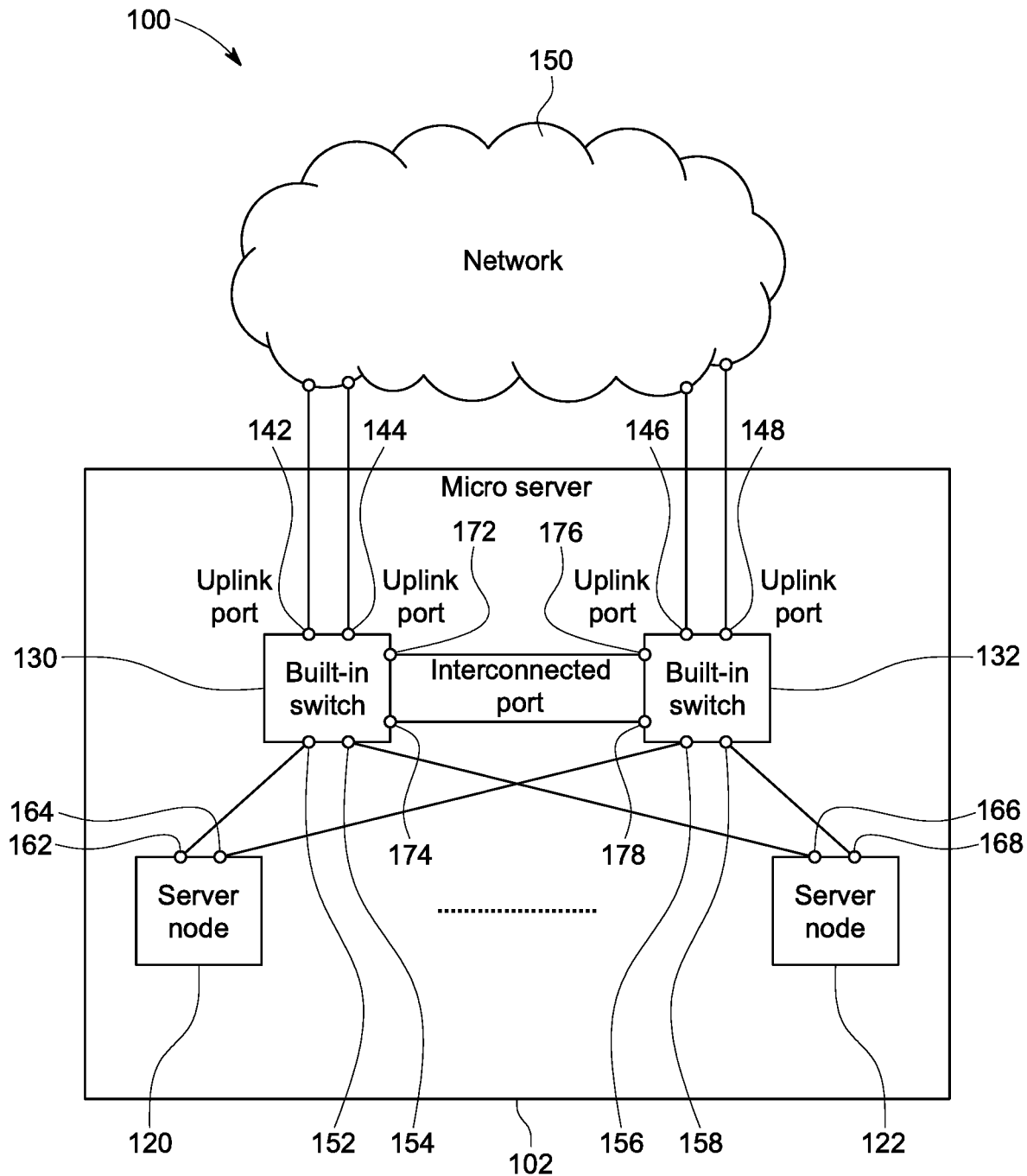
FIG. 2 is a block diagram of a multi-node server system that includes an example improved backup mechanism for uplink failure.
Figure 3:
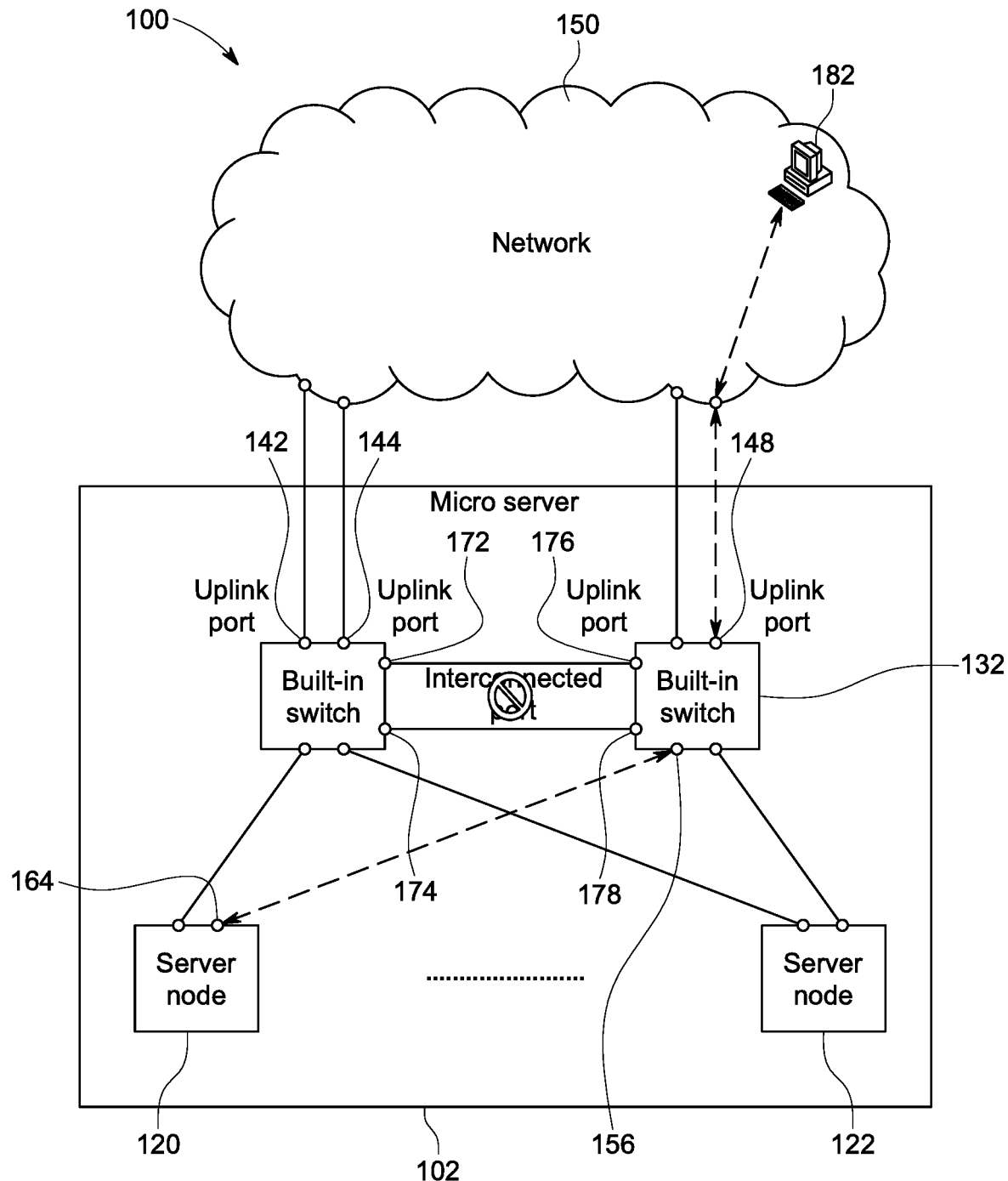
FIG. 3 is a block diagram of the multi-node system in FIG. 2 under normal operation.
Figure 4:
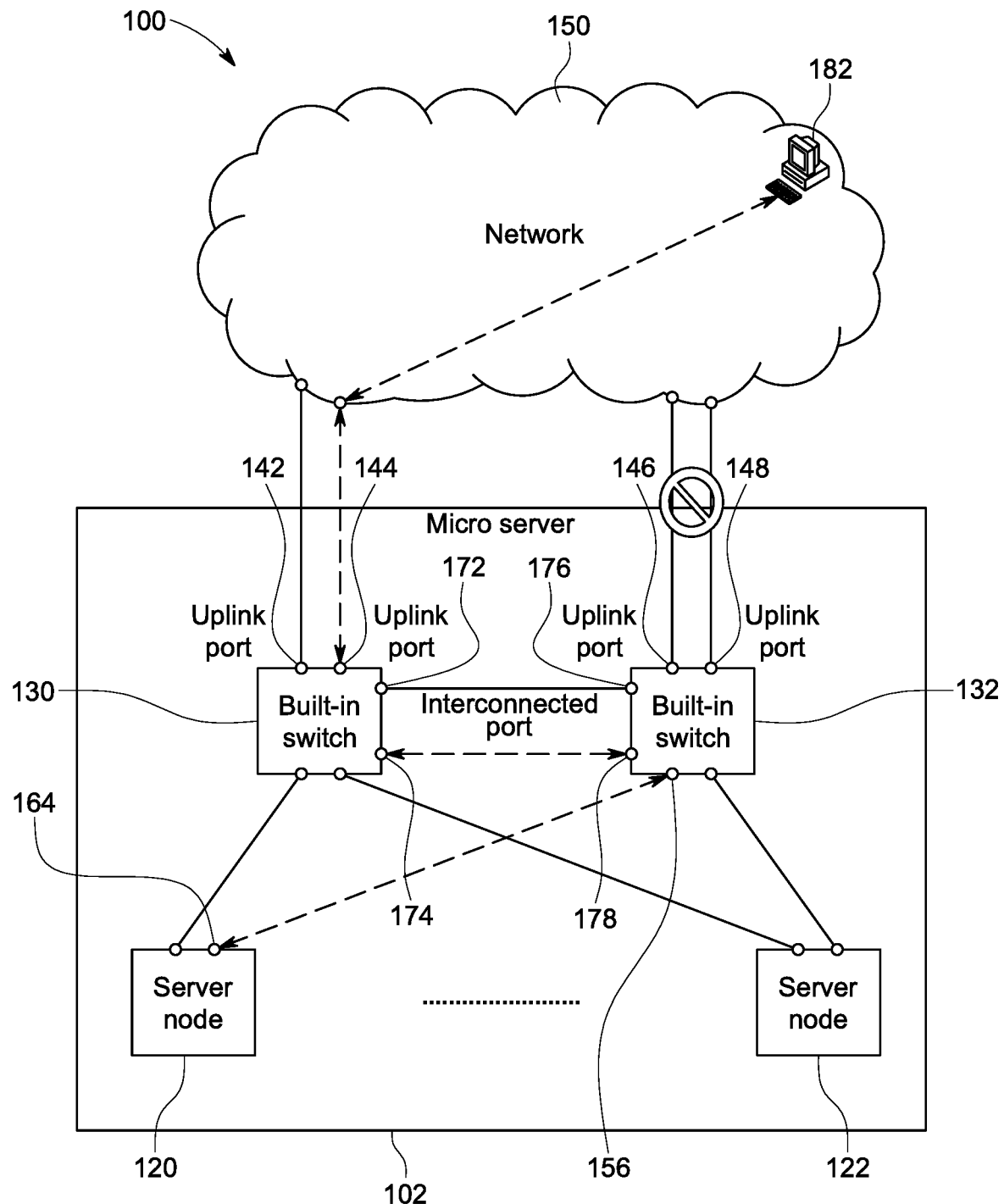
FIG. 4 is a block diagram of the multi-node system in FIG. 2 when an example backup mechanism is enabled.

FIGS. 3-4 show the backup mechanism that ensures communication with the network 150 continues for the system 100 in FIG. 2. Like elements in FIGS. 3-4 are labeled with like numbers as their counterparts in FIG. 2. FIG. 3 shows a normal flow of data between nodes of the server 102 (in FIG. 2) and the network. For example, a host 182 in the network 150 communicates to the node 122 within the server 102. FIG. 3 shows the traffic flow between the host 182 and the server node 120 when all uplink ports work correctly. In this scenario, the server node 120 chooses the built-in switch 132 to communicate to the host 182 in the network 150. Thus, data flows through the port 164 of the node 120 to the downstream port 156 of the switch 132. The data is routed by the switch 132 through the uplink port 148 to the network 150 to the host 182. Packet filtering rules on the built-in switches prevent data traffic from being passed through the interconnected ports 172, 174, 176, and 178. Similarly, the built-in switch 132 (in FIG. 2) forwards packets toward the host 182 via its uplink port 148.

FIG. 4 shows a situation where both uplink ports 146 and 148 of the built-in switch 132 are out of order. In this case, the built-in switch 132 would notify the built-in switch 130 of the failure of its uplink ports. The packet filtering rules set on the interconnection ports 176 and 178 of the built-in switch 132, as well as those set on the interconnection ports 172 and 174 of the built-in switch 130, are then disabled. Packets are thus allowed to be passed through interconnected ports 172, 174, 176, and 178 hereafter. In this example, packets are passed through the interconnection port 178 to the interconnection port 174 of the switch 130. As shown in FIG. 4, packets from the server node 120 are sent through the port 164 to the downstream port 156 of the switch 132. The packets are routed by the switch 132 through the interconnection port 178 to the interconnection port 174 of the switch 130. The switch 130 routes the packets through the uplink port 144 to the network 150 to the host 182.

In the case that either of uplink ports 146 or 148 of the switch 132 recover functionality, the switch 132 notifies the switch 130 of the recovery, and the packet filtering rules set on both built-in switches 130 and 132 are then enabled. Thus, the data packets from the interconnection ports 172, 174, 176 and 178 are blocked. From that point, the built-in switch 132 is able to forward packets toward the host 182 via one of the now recovered uplink ports 146 or 148 as shown in FIG. 3.

Figure 5:
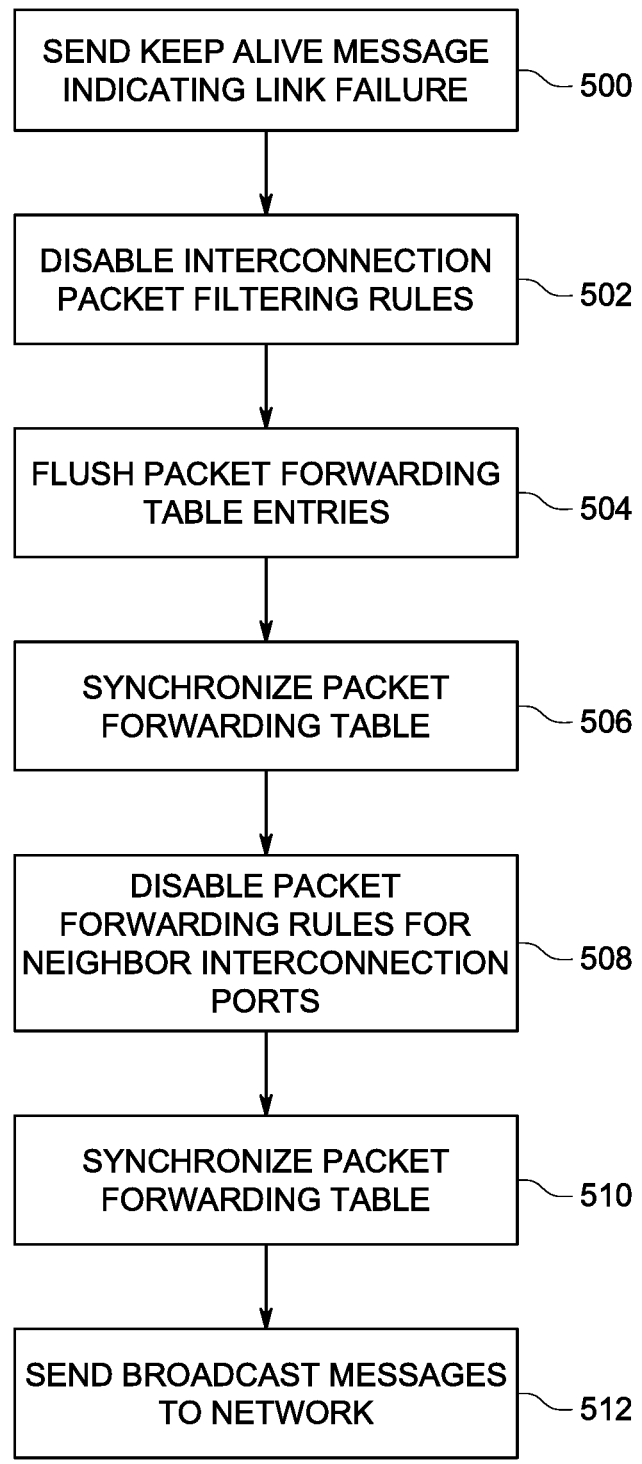
FIG. 5 is a flow diagram of the routine for the backup of an uplink failure between the nodes and the network in the system in FIG. 4.

The example backup routine thus operates as follows on failure of all uplink ports of a switch. FIG. 5 is a flow diagram of the backup routine. When a failure of an uplink port occurs, an initial built-in switch issues a keep-alive message indicating the failure of its uplink ports to its neighbor built-in switch (500). This is followed by a routing process starting at (502) The initial built-in switch disables the packet filtering rules configured on the interconnection ports linked with the interconnection ports of the neighboring switch (502). This allows all types of packets to be received and transmitted on interconnection ports between the two switches.

All packet forwarding table entries related with its uplink ports are flushed in the initial switch (504). The initial built-in switch synchronizes its packet forwarding table to the packet forwarding table of the neighboring switch (506). Specifically, the built-in switch issues broadcast messages to the neighboring switch. Each of the source MAC addresses of the broadcast messages are set to the MAC addresses of the server nodes attached to the built-in switch toward the interconnected ports.

When receiving a keep alive message indicating the failure of an uplink port of a neighboring built-in switch, the neighboring built-in switch disables the packet filtering rules configured on the interconnection ports (508), which allows all types of packets to be transmitted and received on the interconnection ports linked to the interconnection ports of the initial switch sending the keep alive message. The packet forwarding table synchronization mechanism is then invoked. The synchronization mechanism updates the packet forwarding table of the neighboring switch according to received broadcast messages from the initiating switch (510). This enables packets toward server nodes connected to the initial built-in switch with the failed uplink port, to be redirected to the interconnected ports, and therefore be sent to the network via the uplink ports of the neighboring built-in switch.

The received broadcast messages are also transmitted toward the uplink ports so that network devices outside the server 102 (in FIG. 2) are aware that they may communicate to the affected server node via the uplink ports of the neighboring built-in switch (512).

Figure 6:
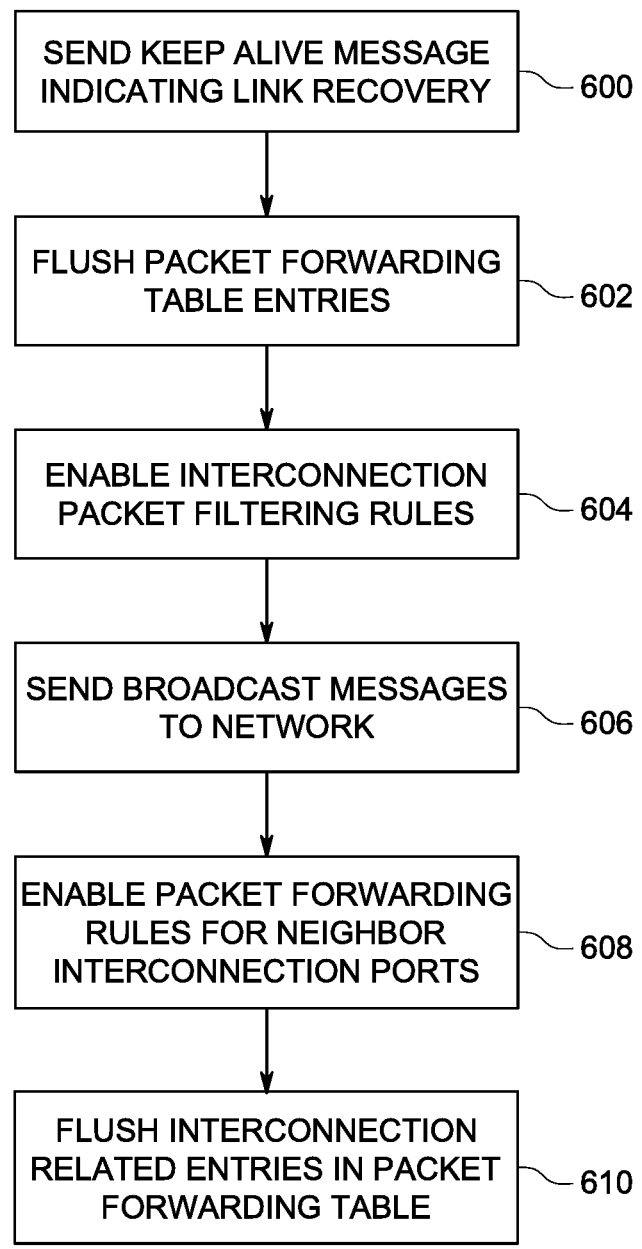
FIG. 6 is a flow diagram for a restoration routine to provide the original routing when an uplink port is recovered.

In the example system 100 in FIG. 2, during operation with diversion to another switch, the system 100 may allow a recovery when either of the failed uplink ports of the initial switch become functional again. The flow diagram in FIG. 6 shows the recovery routine, where the initial switch discovers one of the failed up link ports has recovered and is now functional. In this instance, the initial built-in switch issues a keep-alive message to the other built-in switch indicating that its uplink port(s) is recovered (600). All packet forwarding table entries related with the interconnected ports of the initial switch are flushed (602).

The initial built-in switch then enables the packet filtering rules which only allow keep-alive messages to be transmitted and received via the interconnection ports with the neighboring switch (604). The initial built-in switch then issues broadcast messages, which have their source MAC addresses set as those of the attached server nodes through the recovered uplink port or ports (606). This enables networked devices outside the server 102 (in FIG. 2) to communicate with the server nodes via the newly recovered uplink port or ports.

When receiving a keep alive message indicating the recovery of the uplink port or ports of initial built-in switch, the neighboring built-in switch first enables the packet filtering rules configured on the interconnected ports (608). This allows only keep-alive messages to be transmitted and received on the interconnection ports. All packet forwarding table entries related with interconnected ports are flushed (610). The traffic is thus switched back to the node through the now recovered uplink port of the initial switch.

The flow diagrams in FIGS. 5-6 are representative of example machine readable instructions for the system 100 in FIG. 2. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 5-6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Although, the examples herein relate to a micro-server, the backup mechanism may be widely deployed in any system where the end device has network connection to duplicate network access devices that are connected to the core network. For example, wireless access points could play the role of the internal switches explained below. A mobile device connected to an access point does not have to take care of an uplink failure in an access point if a similar approach is adopted where another access point with a functioning uplink has an interconnection with the initial access point.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A multi-node server device with backup connection to a network, the multi-node server device comprising:
a first server node, within the multi-node server device, having a port operable to transmit or receive data packets;
a first internal switch, within the multi-node server device, having a downstream port coupled to the port of the first server node, an interconnection port, and one or more uplink ports coupled to the network, the first internal switch configured to detect for failure of network communication on the uplink ports; and
a second internal switch, within the multi-node server device, having a downstream port, an interconnection port coupled to the interconnection port of the first internal switch, and an uplink port coupled to the network,
wherein on detecting concurrent failure of network communication at the uplink ports of the first internal switch, data packets from the first server node are routed within the multi-node server device through the downstream port of the first internal switch, the interconnection ports, and through the uplink port of the second internal switch to the network, and
wherein the first internal switch and the second internal switch include packet forwarding tables synchronized over the coupled interconnection ports, the packet forwarding tables configured to provide seamless communication between the first server node and the network during concurrent failure of network communications.

2. The device of claim 1, wherein on the detecting of the concurrent failure of network communication at the uplink ports of the first internal switch, data packets received by the uplink port of the second internal switch for the first node, are routed through the interconnection ports, through the downstream port of the first internal switch to the first node.

3. The device of claim 1, further comprising a second node having a port operable to transmit or receive data packets coupled to the downstream port of the second internal switch.

4. The device of claim 1, wherein the first internal switch includes a packet forwarding table that includes entries to route the data packets from the first node through the uplink port and entries to route data packets to the first node through the downstream ports, wherein on detecting concurrent failure of the network communications at the uplink ports of the first internal switch, the entries in the packet forwarding table are flushed.

5. The device of claim 1, wherein the first internal switch includes a filter routine that only allows messages indicating the health status of the uplink ports of the first internal switch to be transmitted on the interconnection port, and wherein the filter routine allows data packet reception on the interconnection port on the detecting of the concurrent failure of the network communications at the uplink ports of the first internal switch.

6. The device of claim 5, wherein the first internal switch is operable to send a message indicating the concurrent failure of network communications at the uplink ports to the second internal switch, and wherein the first and second internal switches are operable to run a filter routine to allow data packets to be transmitted and received on the interconnection ports.

7. The device of claim 6, wherein the first internal switch is operable to send a broadcast message that includes a MAC address of the first node upon the detecting of the concurrent failure of the network communication on the uplink ports of the first internal switch.

8. The device of claim 7, wherein the second internal switch includes a packet forwarding table including entries that include routing data for the first node, and wherein the second internal switch is operable to update the entries in the packet forwarding table based on the broadcast message.

9. The device of claim 7, wherein the second internal switch is operable to send the broadcast message to the network to enable data transmission from the network to the first node through the second internal switch.

10. The device of claim 1, wherein the first internal switch is operable to restore routing of data packets from the first node to the uplink port of the first internal switch if after the detecting of the concurrent failure of the network communication to the uplinks port of the first internal switch, network communication to at least one of the uplink ports of the first internal switch is resumed.

11. A method of providing backup communication between a multi-node server and a network, the multi-node server comprising: a first node having a port; a first internal switch having a downstream port coupled to the port of the first node, an interconnection port, and an one or more uplink ports coupled to the network; and a second internal switch having a downstream port, an interconnection port coupled to the interconnection port of the first internal switch, and an uplink port coupled to the network, the method comprising:
  synchronizing over the coupled interconnection ports packet forwarding tables on the first internal switch and the second internal switch;
  detecting, within the multi-node server, concurrent failure of network communication at the uplink ports of the first switch; and
  in response to the detecting within the multi-node server the concurrent failure of network communication at the uplink ports of the first switch, performing a routing process within the multi-node server comprising:
    routing data packets from the port of the first node from the first internal switch through the interconnection ports of the first and second internal switches to the second internal switch; and
routing the received data packets to the uplink port of the second internal switch that is coupled to the network, the packet forwarding tables configured to provide seamless communication between the first server node and the network during concurrent failure of network communications.

12. The method of claim 11, wherein the routing process further comprises routing data packets received by the uplink port of the second internal switch for the first node, through the interconnection ports, and through the downstream port of the first internal switch to the first node.

13. The method of claim 11, wherein the multi-node device further comprises a second node having a port operable to transmit or receive data packets coupled to the downstream port of the second switch.

14. The method of claim 11, wherein the routing process further comprises flushing entries of the first internal switch, wherein the packet forwarding table includes entries to route the data packets from the first node through the uplink port.

15. The method of claim 11, wherein the first internal switch includes a filter routine that only allows messages indicating the health status of the uplink port on the interconnection port, and wherein the routing process further comprises allowing the filter routine to receive data packets on the interconnection port.

16. The method of claim 15, wherein the routing process further comprises sending a broadcast message via the first internal switch indicating the concurrent failure of network communications at the uplink ports to the second internal switch, and configuring the second internal switch to run a filter routine to allow data receipt on the interconnection port linked with the interconnection port of the first internal switch.

17. The method of claim 16, wherein the routing process further comprises sending a broadcast message including a MAC address of the first node.

18. The method of claim 17, further comprising updating a packet forwarding table of the second internal switch based on the broadcast message, wherein the packet forwarding table includes entries including, routing data for the first node.

19. The method of claim 17, further comprising sending the broadcast message to the network via the second internal switch to enable data transmission from the network to the first node through the second internal switch.

20. The method of claim 11, further comprising restoring routing of data packets from the first node to the uplink port of the first internal switch, if network communication to the uplink port of the first switch is resumed.

* * * * *